(12) United States Patent
Zwayer (10) Patent No.: US 11,350,618 B2
(45) Date of Patent: Jun. 7, 2022

(54) TOUCHLESS PICKUP ARM SPINNERHEAD

(71) Applicant: W.C. BRADLEY/ZEBCO HOLDINGS, INC., Tulsa, OK (US)

(72) Inventor: Kent L. Zwayer, Tulsa, OK (US)

(73) Assignee: ZEBCO HOLDINGS, LLC, Tulsa, OK (US)

( * ) Notice: Subject to any disclaimer, the term of this patent is extended or adjusted under 35 U.S.C. 154(b) by 441 days.

(21) Appl. No.: 16/582,843

(22) Filed: Sep. 25, 2019

(65) Prior Publication Data

US 2021/0084875 A1 Mar. 25, 2021

(51) Int. Cl.
*A01K 89/01* (2006.01)
*A01K 89/027* (2006.01)

(52) U.S. Cl.
CPC .... *A01K 89/01026* (2015.05); *A01K 89/0108* (2013.01); *A01K 89/0275* (2013.01); *A01K 2227/40* (2013.01)

(58) Field of Classification Search
CPC .......... A01K 89/01029; A01K 89/0108; A01K 89/0275
See application file for complete search history.

(56) References Cited

U.S. PATENT DOCUMENTS

| | | | |
|---|---|---|---|
| 2,541,360 A | 2/1951 | Hull | |
| 2,668,025 A | 2/1954 | Hull | |
| 2,675,193 A | 4/1954 | Hull | |
| 2,964,257 A | 12/1960 | Hull | |
| 3,020,666 A | 2/1962 | Hull | |
| 3,059,873 A | 10/1962 | Hull | |
| 3,088,691 A | 5/1963 | Hull | |
| 3,185,405 A | 5/1965 | Hull | |
| 3,469,799 A | 9/1969 | Hull | |
| 3,481,554 A | 12/1969 | Hull | |
| 3,552,674 A | 1/1971 | Hull | |
| 3,836,092 A * | 9/1974 | Hull | A01K 89/0102 242/321 |
| 4,156,510 A * | 5/1979 | Hull | A01K 89/0102 242/240 |
| 4,474,341 A | 10/1984 | Shackelford et al. | |
| 5,918,827 A * | 7/1999 | Pulliam | A01K 89/0102 242/314 |
| 9,210,920 B1 * | 12/2015 | Zwayer | A01K 89/01029 |
| RE47,184 E | 1/2019 | Zwayer et al. | |

* cited by examiner

*Primary Examiner* — Emmanuel M Marcelo
(74) *Attorney, Agent, or Firm* — James F. Lea, III; Gable Gotwals (57) ABSTRACT

A reel, such as a spincast reel, provides increased cranking power by eliminating sliding contact associated with a line pickup mechanism when the reel is in line retrieval mode. Fishing line is retrieved by locating a cam member proximate a body spool boss during a casting state for positioning the cam member to be acted on by cam engaging structure of the body spool boss. The cam member is rotated relative to the body spool boss. The cam member and a pick up pin are moved radially outwardly by the cam engaging structure. The cam member is axially moved away from the body spool boss. The cam member may then be rotated relative to the body spool boss during a line retrieve state, wherein the cam member and the body spool boss are spaced apart from one another for facilitating frictionless relative rotation.

23 Claims, 10 Drawing Sheets

TOUCHLESS PICKUP ARM SPINNERHEAD

FIELD OF THE INVENTION

The invention relates to fishing reels. More particularly, the invention relates to spincast reels having improved construction for eliminating friction during line retrieval mode.

BACKGROUND OF THE INVENTION

Closed face fishing reels are well known to the art and have been manufactured in large quantities at comparatively low cost for many years in a variety of embodiments. Representative of the earlier reels are many U.S. patents issued to R. D. Hull, including among others, U.S. Pat. Nos. 2,541,360; 2,668,025; 2,675,193; 2,964,257; 3,020,666; 3,059,873; 3,088,691; 3,185,405; 3,469,799; 3,481,554; 3,552,674; and 4,474,341.

Closed faced spinning reels or spincast reels include a line spool from which fishing line is paid out and retrieved by a pickup, such as a pick-up pin. The pick-up pins are rotated by a crank mechanism geared thereto. A drag brake mechanism is typically provided to permit a payout of line when a predetermined amount of force is exerted on the line by a hooked fish. An anti-reverse mechanism is typically provided to prevent rotation of the crank handle in the payout direction. A closed face cover completely envelopes the reel mechanism. An actuation mechanism such as a thumb button or under-rod lever is provided for preparing the internal mechanism for casting.

In a typical construction of a spincast reel, cranking power in line retrieval mode is somewhat diminished by friction associated with sliding contact of the line pickup mechanism with non-rotating components. Various methods have been attempted to lessen the friction due to the sliding contact in line retrieval mode.

SUMMARY OF THE INVENTION

In one embodiment, the reel of the invention increases cranking power over conventional spincast reel designs by eliminating sliding contact associated with the line pickup mechanism in line retrieval mode.

The fishing reel of the invention has a body spool boss having first end that defines cam engaging structure, such as cam engaging protrusions. A fishing line receiving spool has a hub that defines a hub passageway. The hub passageway receives the body spool boss. In one embodiment, the body spool boss and the spool are rotatably fixed with respect to one another. A reel cover surrounds the spool and other reel components. Fishing line exits the reel through an orifice in the center of the spool cover.

A brake base is positionable in a first position adjacent the reel cover and a second position spaced away from the reel cover. A spinner head assembly is adjacent to the brake base. Pin arms are provided that are pivotally affixed to a second surface of the spinner head assembly, The pin arms are positionable in a radially extended position and a radially retracted position.

Cam members are attached to each pin arm for radial pivoting with the respective pin arm. The cam members are positionable in a retracted position and an extended position. In one embodiment, the cam members are movable in an axial direction and are biased in an axially retracted position. The cam members each define contacting surfaces. In one embodiment, the cam members comprises lower inside cams that define the contacting surfaces. In one embodiment, when the cam members are in the extended position, second surfaces of the cam members are adjacent to the first end of the body spool boss, wherein the cam engaging structure of the body spool boss engages the contacting surfaces of the cam member when the cam member and the body spool boss are rotated relative to one another. When the cam members are in the retracted position, the contacting surfaces are spaced a distance away from the first end of the body spool boss for facilitating friction free relative rotation of the cam members with respect to the body spool boss.

In use, the spinner head assembly is rotated with respect to the spool and with respect to the body spool boss. A brake base is positioned that is spaced away from the reel cover. The contacting surfaces of the cam members are positioned to engage the cam engaging structure on the first end of the body spool boss for moving the pin arms from a radially retracted position to a radially extended position for facilitating winding engagement with fishing line. The cam member is retracted, wherein the contacting surface is spaced a distance away from the first end of the body spool boss for facilitating friction free relative rotation of the cam member with respect to the body spool boss.

DETAILED DESCRIPTION OF THE PREFERRED EMBODIMENTS

Referring now FIGS. 1-6, shown is fishing reel 10 having a touchless pickup arm spinnerhead. Reel 10 includes main shaft 12 defining an interior passageway. Main shaft 12 has a first end 16, a threaded area adjacent first end 16, and a bearing receiving surface adjacent the threaded area.

Threaded spinnerhead bracket 30 (FIGS. 1-6, 10) has a first end 32, a second end 34 (FIG. 10), and defines a passageway having a first diameter portion proximate to first end 32. For purposes of this application, when describing components, a first end or first side is the end or side closest to the top of FIGS. 1-6, whereas the second end or second side is the end or side closest to the bottom of FIGS. 1-6. Threaded spinnerhead bracket 30 defines a second diameter portion proximate to second end 34. Threaded spinnerhead bracket 30 further defines an external shoulder adjacent first end 32. The external shoulder has a first side and a second side. Threaded spinnerhead bracket 30 further defines an internal shoulder proximate to an external shoulder. Internal shoulder is located between a first diameter portion and a second diameter portion. Second diameter portion defines interior threads for being threadably received on threaded area of main shaft 12.

Brake base 60 (FIGS. 1-6, 10) defines plate portion 62 having a center and an outside. Brake base 60 additionally defines first side 68 and second side 70. Brake base 60 defines a brake pad receiving area on first side 68. Brake base 60 additionally defines circumferential wall portion 74 that defines annular edge surface 76. Brake base 60 additionally includes first brake base tab 78 and second brake base tab 80 that extend from second side 70 of plate portion 62. First brake base tab 78 defines first a terminal end and an outer surface. Second brake base tab 80 defines second terminal end and outer surface. Brake base stem 90 extends from second side 70 of center of plate portion 62. Brake base stem 90 defines a terminal end. Brake base stem 90 further defines a spring retainer groove adjacent to terminal end. Brake base stem 90 is received in interior passageway of main shaft 12. A spring retainer is received in spring retainer groove of brake base stem 90.

Brake pad 100 (FIGS. 1-6, 10) is received in a brake pad receiving area of first side 68 of brake base 60.

Brake base spring 120 (FIGS. 1-6) has a first end and a second end. Brake base spring 120 surrounds brake base stem 90 inside of second diameter portion of interior passageway of threaded spinnerhead bracket 30. First end of brake base spring 120 abuts interior shoulder of threaded spinnerhead bracket 30. Second end of brake base spring 120 abuts brake base spring retainer. Brake base spring 120 is for biasing brake base 60 in a second direction into an axially retracted position.

Figure 9:
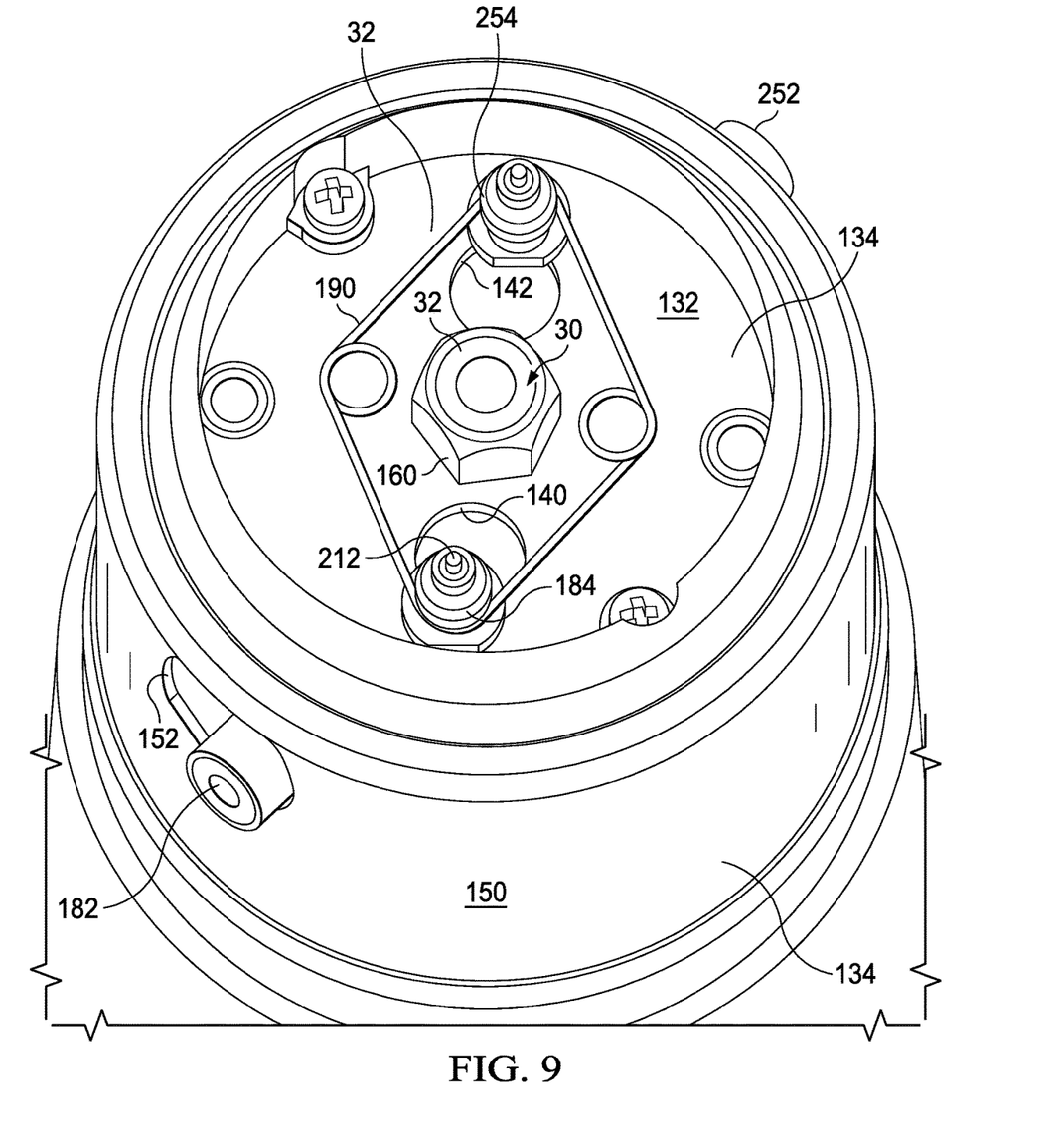
FIG. 9 is perspective view of the first side of the plate portion of the spinner head assembly showing the pin arm spring engaging the spring receivers of the pin arms.
Figure 10:
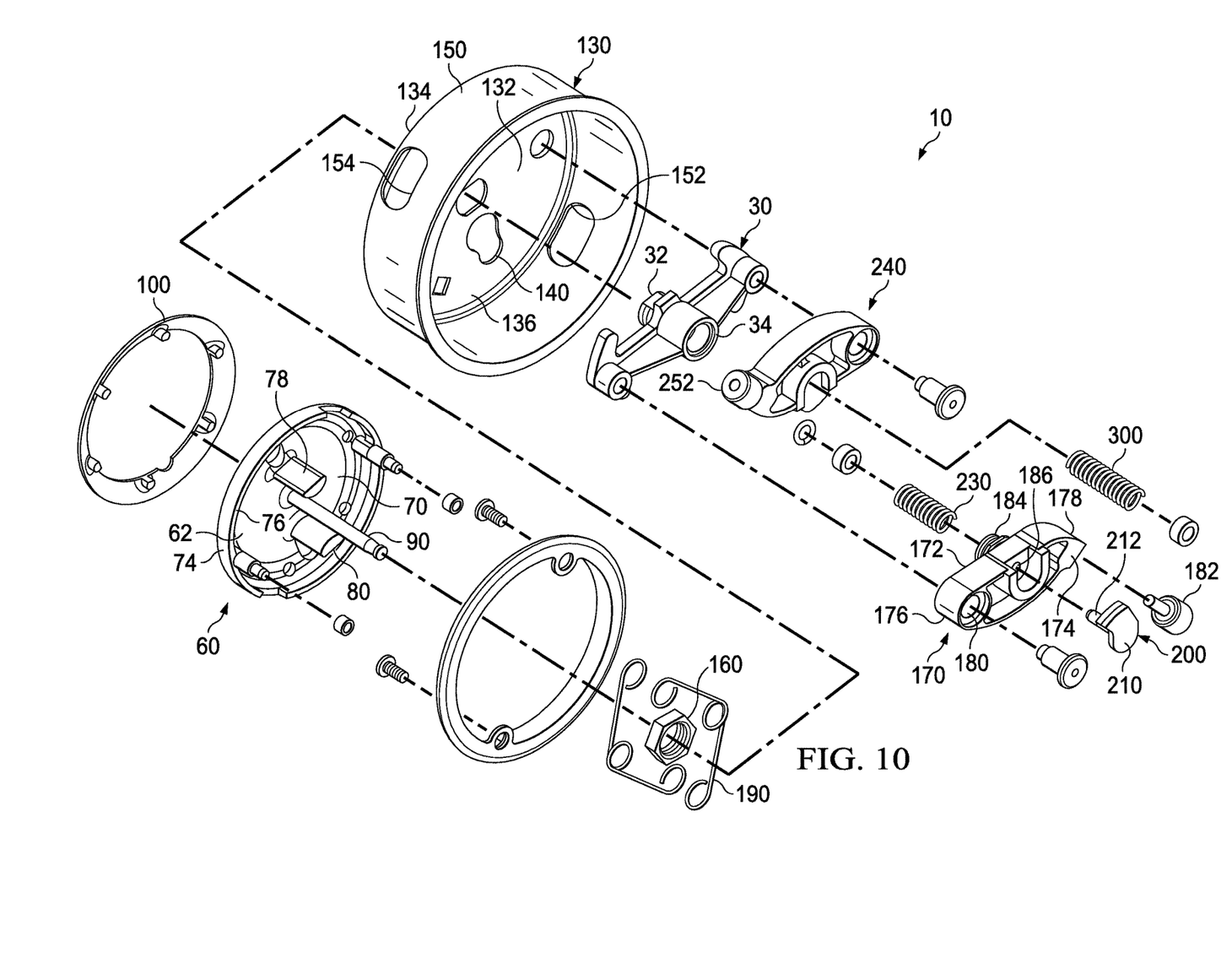
FIG. 10 is an exploded perspective view of the spinner head assembly of FIGS. 1-6.

Spinnerhead assembly 130 (FIGS. 1-6, 10) has plate portion 132 that is substantially perpendicular to brake base stem 90. Plate portion 132 has a first side 134 (FIGS. 1-6, 9, 10) and a second side 136 (FIG. 10). Plate portion 132 of spinnerhead assembly 130 defines a central orifice, first slot 140 (FIGS. 1-6, 9, 10), second slot 142, and an outside. The central orifice has a complementary shape to a protuberance defined as first end 32 of threaded spinnerhead bracket 30 for rotatably affixing spinnerhead assembly 130 to threaded spinnerhead bracket 30. Spinnerhead assembly 130 defines a circumferential wall portion 150 that extends from second side 136 of outside of plate portion 132. Circumferential wall portion 150 is substantially parallel to brake base stem 90. Circumferential wall portion 150 defines first pickup pin orifice 152 (FIGS. 1-6, 9, 10) and second pickup pin orifice 154 (FIG. 10). Second side 136 of plate portion 132 contacts first side of external shoulder of threaded spinnerhead bracket 30. Central orifice of spinnerhead assembly 130 receives first end 32 (FIG. 9) of threaded spinnerhead bracket 30 wherein first brake base tab 78 of brake base 60 is received in first slot 140 of spinnerhead assembly 130. Second brake base tab 80 of brake base 60 is received in second slot 142 of spinnerhead assembly 130. First side 134 of spinnerhead assembly 130 selectively engages annular edge surface 76 of circumferential wall portion 74 of brake base 60 for limiting longitudinal travel of brake base 60 in a second direction relative to spinnerhead assembly 130.

Spinnerhead bracket nut 160 (FIGS. 1-6, 9, 10) is threadably received on external threads on first end 32 of threaded spinnerhead bracket 30 for securing plate portion 132 of spinnerhead assembly 130 between spinnerhead bracket nut 160 and first side of external shoulder of threaded spinnerhead bracket 30 for securing threaded spinnerhead bracket 30 to spinnerhead assembly 130.

First pin arm 170 (FIGS. 1-8, 10) defines first side 172 (FIGS. 7, 8, 10), second side 174, inner end 176, and outer end 178. First pin arm 170 defines pivot orifice 180 (FIGS. 7, 8, 10) proximate inner end 176. First pin arm 170 carries first pickup pin 182 extending from outer end 178. First pin arm 170 is pivotally mounted to second side 136 of plate portion 132 of spinnerhead assembly 130. First side 172 of first pin arm 170 is adjacent second side 136 of plate portion 132 of spinnerhead assembly 130. First pin arm 170 defines first spring receiver 184 that extends from first side 172 of first pin arm 170 through first slot 140 of plate portion 132 of spinnerhead assembly 130. First spring receiver 184 defines first pin arm passageway 186 having an internal shoulder. First pin arm 170 is selectively positioned in a radially extended position (FIGS. 1, 2, 6, 7, 9) or a radially retracted position (FIGS. 3-5, 8). First pickup pin 182 extends through first pickup pin orifice 152 (FIGS. 1-6, 9, 10) of circumferential wall portion 150 of spinnerhead assembly 130 when first pin arm 170 is in the radially extended position.

In one embodiment, pin arm spring 190 (best seen in FIGS. 9 and 10) communicates with first spring receiver 184 and second spring receiver 254 for biasing first pin arm 170 and second pin arm 240 (FIGS. 1-6, 10) towards a retracted position.

First cam member 200 (FIGS. 1-8, 10) has lower inside cam 202 and upper inside cam 204. Lower inside cam 202 defines a contacting surface. Upper inside cam 204 has a contacting surface and an upper surface 206. First cam member 200 has first surface 208 and a second surface 210. First cam member 200 additionally has a first cam member shaft 212 extending from first surface 208. First cam member shaft 212 defines a first retainer groove. First cam member 200 is positionable into an axially retracted position (see FIGS. 1, 3, 7) and an axially extended position (see FIGS. 5, 6, 8). First bushing retainer is received in first retainer groove of first cam member shaft 212. A first bushing is adjacent first bushing retainer.

First cam spring 230 (FIGS. 1-6, 10) is received on first cam member shaft 212 and inside first pin arm passageway 186 of first pin arm 170. First cam spring 230 has a first end and a second end. First end engages first bushing. Second end engages internal shoulder of first pin arm passageway 186 for biasing first cam member 200 in a first direction wherein first cam member 200 is in an axially retracted position.

Second pin arm 240 (FIGS. 1-6, 10), similar to first pin arm 170, defines a first side, a second side, an inner end, and an outer end. Second pin arm 240 defines pivot orifice proximate inner end and a second pickup pin 252 (FIGS. 9, 10) extending from outer end. Second pin arm 240 is pivotally mounted to second side 136 of plate portion 132 of spinnerhead assembly 130. First side of second pin arm 240 is adjacent second side 136 of plate portion 132 of spinnerhead assembly 130. Second pin arm 240 defines a second spring receiver 254 (FIG. 1-6, 9) that extends from second side of second pin arm through second slot 142 of plate portion 132 of spinnerhead assembly 130. Second spring receiver 254 defines a second pin arm passageway having an internal shoulder. Second pin arm 240 is selectively positioned in a radially extended position or a radially retracted position. Second pickup pin 252 extends through second pickup pin orifice 154 or circumferential wall portion 150 of spinnerhead assembly 130 when second pin arm 240 is in the radially extended position.

Figure 5:
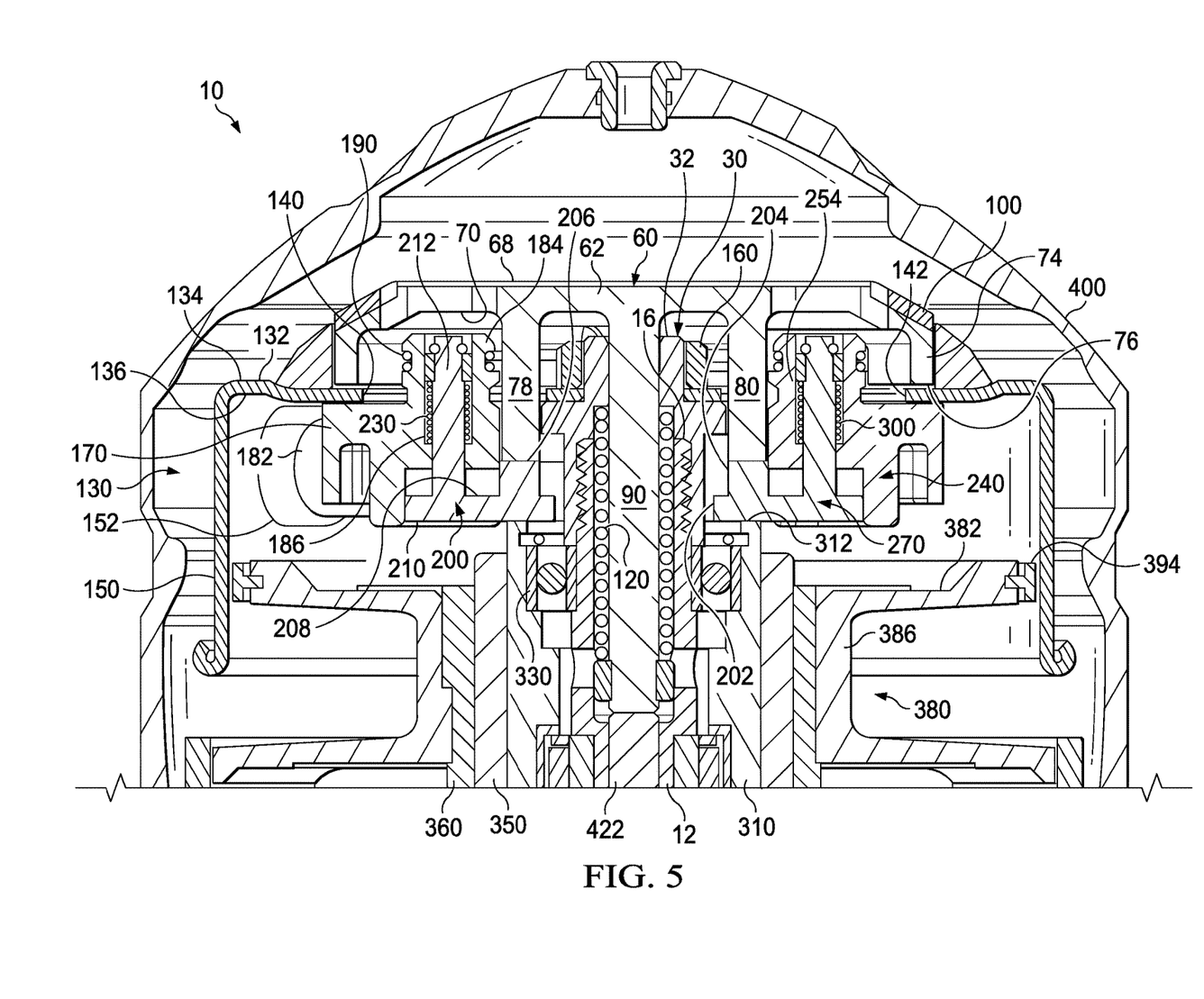
FIG. 5 is a cross-sectional view of a spincast reel of FIG. 1 shown in a casting-line free position.
Figure 6:
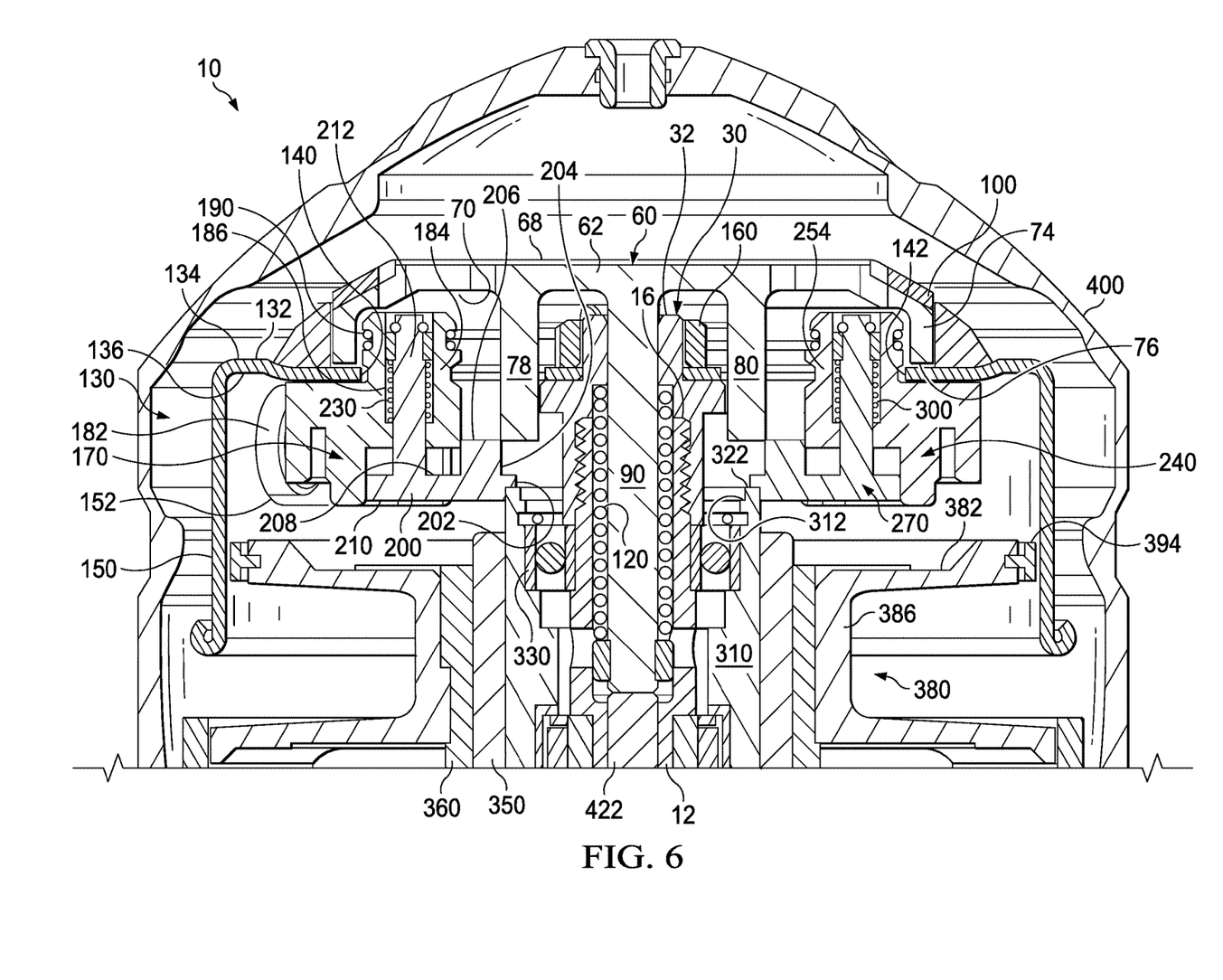
FIG. 6 is a cross-sectional view of a spincast reel of FIG. 1 shown in a re-engage line retrieve position.
Figure 7:
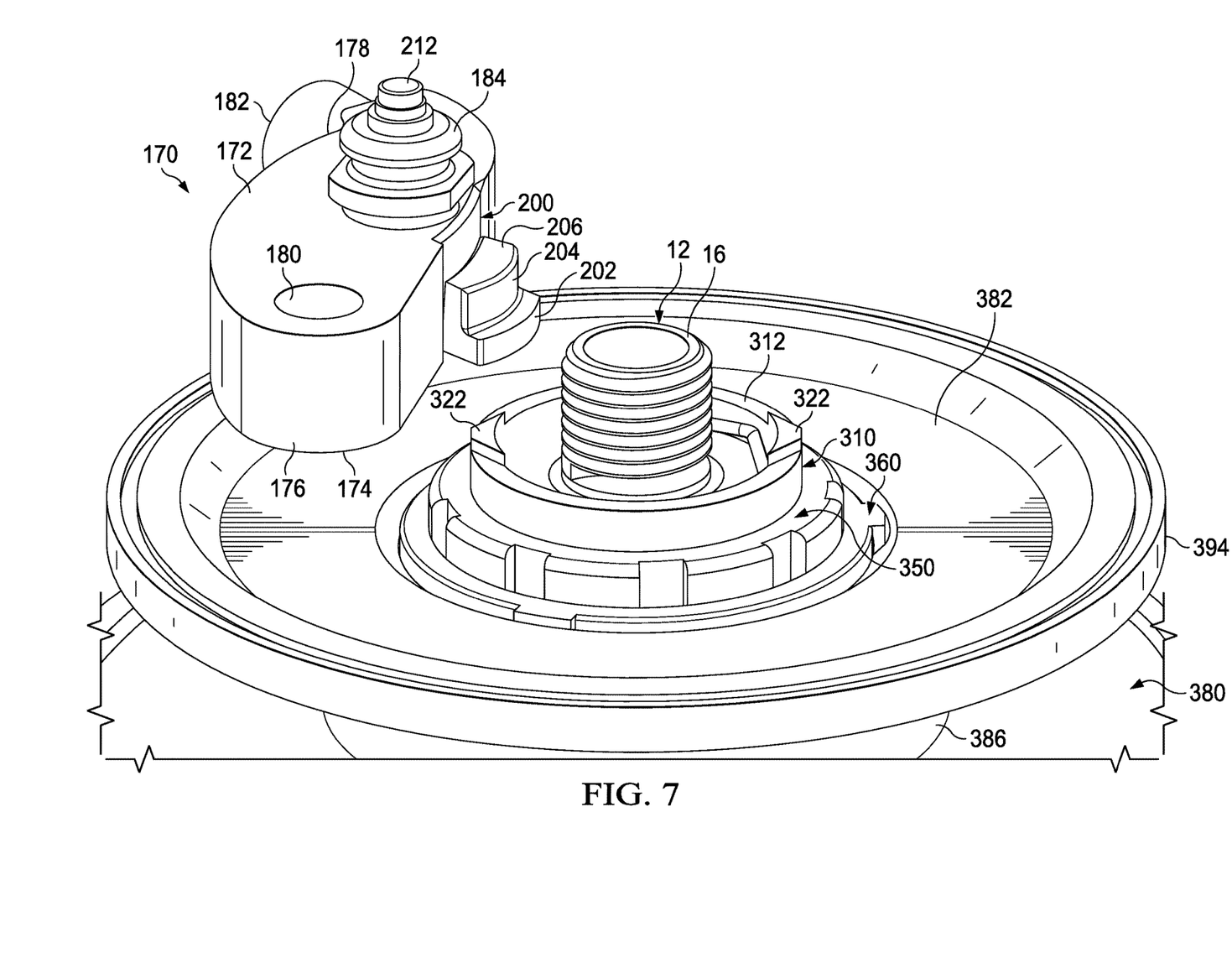
FIG. 7 is an enlarged view of the first pin arm and first cam member in the line retrieve position of FIG. 1.
Figure 8:
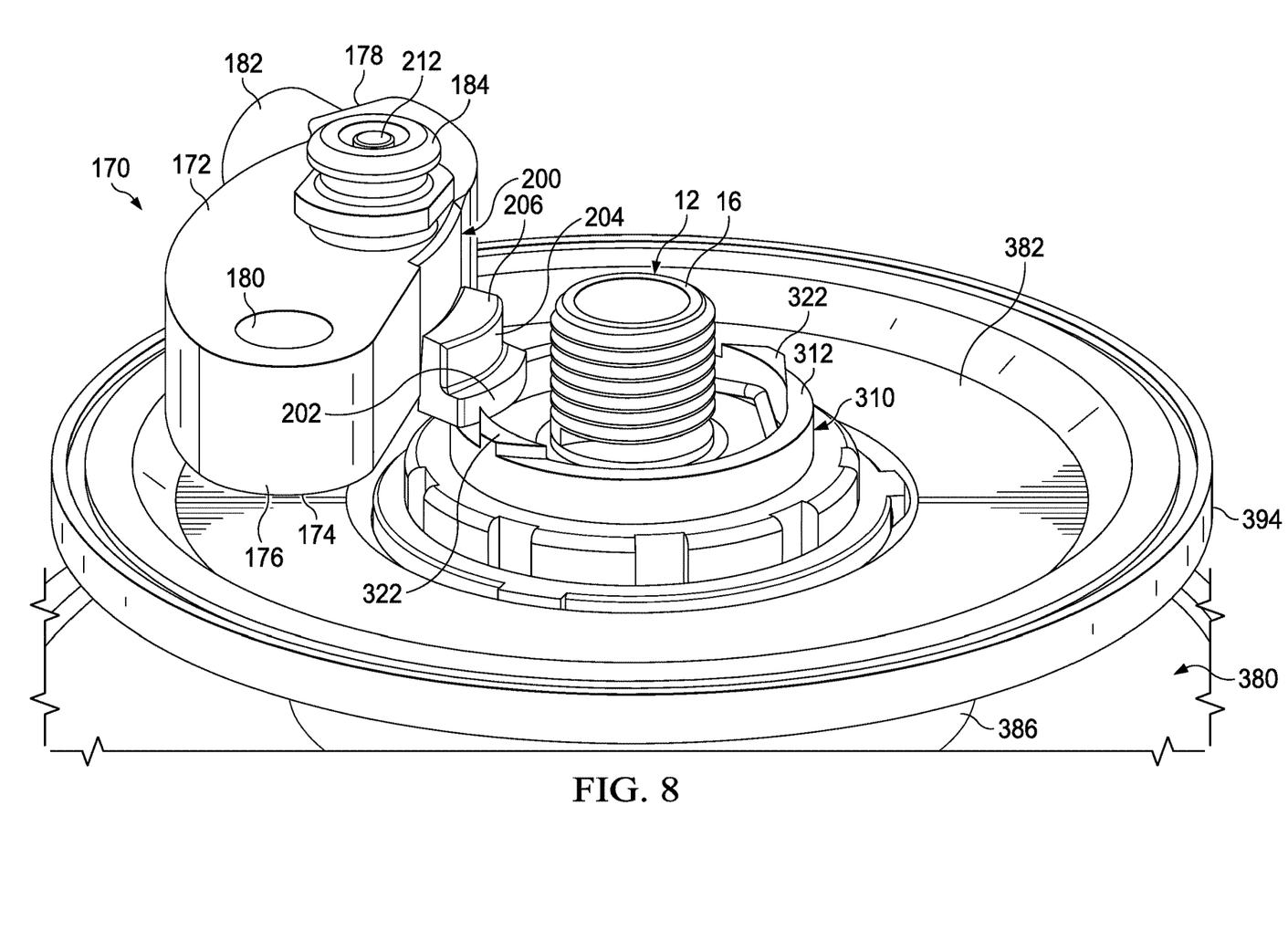
FIG. 8 is an enlarged view of the first pin arm and first cam member in a casting-line free position of FIG. 5.

Second cam member 270 (FIGS. 1-6) has lower inside cam and upper inside cam. Upper inside cam has upper surface. Second pin arm cam member 270 has first surface and second surface. Second cam member shaft extends from second surface. Second cam member shaft defines second retainer groove. Second cam member 270 is positionable in an axially retracted position (FIGS. 1, 3) and an axially extended position (FIGS. 5, 6). Second bushing retainer is received in second retainer groove of second cam member shaft. Second bushing is adjacent second bushing retainer.

Second cam spring 300 (FIGS. 1-6, 10) is received on second cam member shaft and inside second pin arm passageway. Second cam spring 300 has first end and a second end. First end engages second bushing. Second end engages internal shoulder of second pin arm passageway for biasing second cam member 270 in a first direction wherein second cam member is in an axially retracted position.

Body spool boss 310 (FIGS. 1-6) has a first end 312. First end 312 defines stepped interior passageway. Body spool boss 310 defines internal receiving groove proximate first end 312. Stepped internal passageway defines first interior shoulder wherein stepped interior passageway defines bearing receiving surface between internal receiving groove and first interior shoulder. Body spool boss 310 defines cam engaging structure, such as cam engaging protrusions 322 (FIGS. 6-8) extending from first end 312. Other cam engaging structure is also contemplated, such as rollers, indentations, etc.

First bearing 330 has first end, second end, outside surface, and inside surface. Inside surface is adjacent bearing receiving surface of main shaft 12. Outside surface is adjacent bearing receiving surface of body spool boss 310 for centering main shaft 12 and allowing main shaft 12 to rotate relative to body spool boss 310. First end of first bearing 330 is adjacent second end 34 of threaded spinnerhead bracket 30.

A retainer ring is located within internal receiving groove of body spool boss 310 for retaining first bearing 330 within body spool boss 310.

Spool carrier 350 (FIGS. 1-7) defines first end, interior surface, and exterior surface. Interior surface surrounds body spool boss 310. Exterior surface defines a plurality of keys.

Spool bearing 360 (FIGS. 1-7) defines a first end, an inside surface, and external surface. Inside surface defines a plurality of internal keys for mating engagement with plurality of keys on exterior surface of spool carrier 350. External surface defines external longitudinal keys.

Spool 380 (FIGS. 1-8) has first flange 382, second flange, separated by hub 386. First flange 382 defines first perimeter surface. First perimeter surface defines a groove. Hub 386 has an inside surface that defines a passageway therethrough. Inside surface is received on external surface of spool bearing.

T-ring 394 (FIGS. 1-8) is received in a groove on first perimeter surface of first flange 382 of spool 380.

Cover 400 (FIGS. 1-6) surrounds threaded spinnerhead assembly 130, brake base 60, and spool 380. Cover 400 defines an inside surface.

Brake base 60 and spinnerhead assembly 130 rotate relative to body spool boss 310, spool carrier 350, and spool 380.

In one embodiment, a crank is provided for rotating brake base 60 and spinnerhead assembly 130 relative to body spool boss 310, spool carrier 350, and spool 380. A thumb button or lever is accessible by a user for axially moving actuator stem 422.

Figure 1:
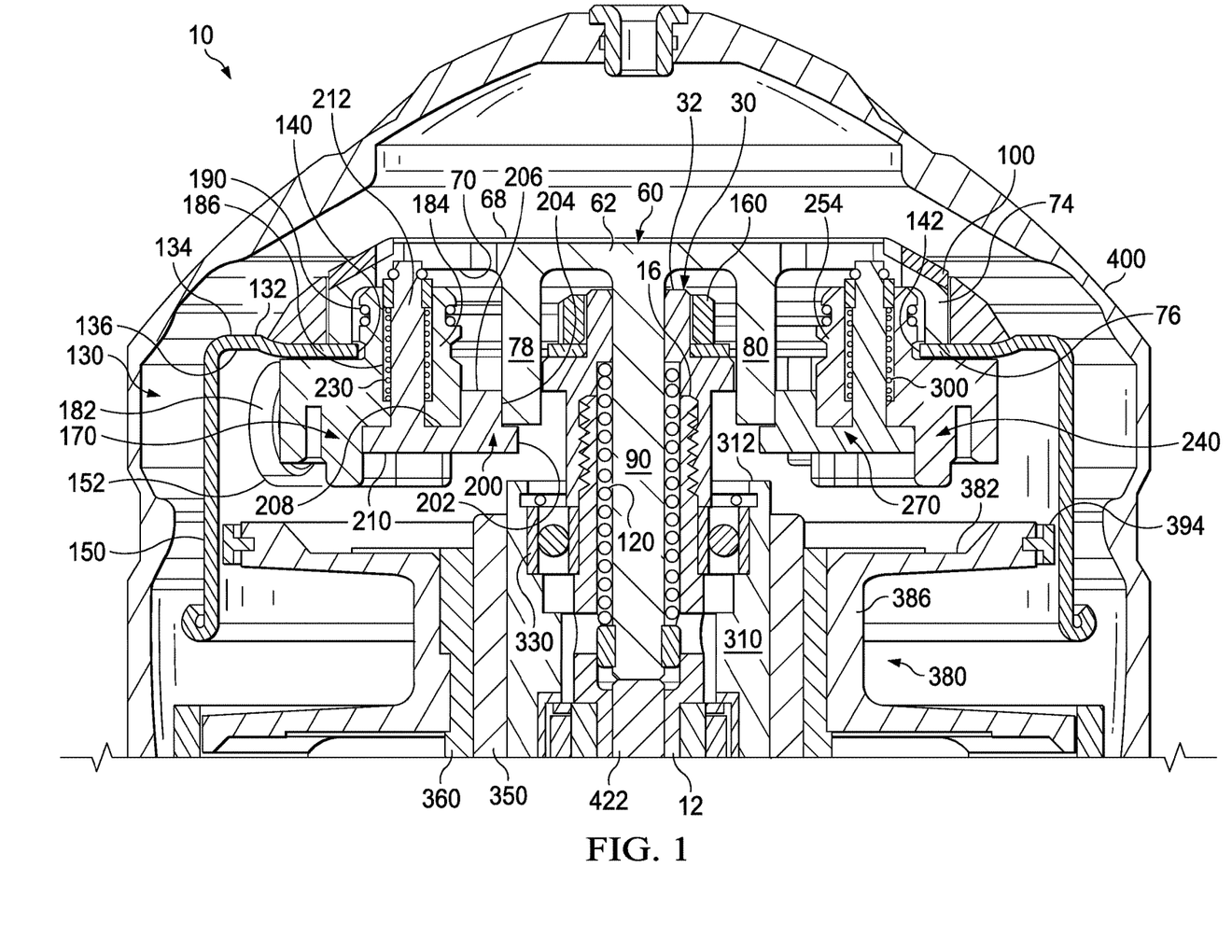
FIG. 1 is a cross-sectional view of a spincast reel of the invention shown in a line retrieve position.

In use, fishing reel 10 will assume one of several operating positions. Referring now specifically to FIG. 1, reel 10 is shown in a line retrieve position.

Brake base 60 and spinnerhead assembly 130 rotate with respect to body spool boss 310.

First cam spring 230 biases first cam member 200 into an axially retracted position wherein upper surface 206 of upper inside cam 204 abuts first terminal end of first brake base tab 78. Lower inside cam 204 abuts outer surface of first brake base tab 78. Upper inside cam 204 maintains first pin arm 170 in the radially extended position so that first pickup pin 182 extends through first pickup pin orifice 152 of circumferential wall portion 150 of spinnerhead assembly 130 for engaging fishing line for wrapping line around hub 386 of spool 380.

Second cam spring 300 biases second cam member 270 into the radially retracted position wherein upper surface of upper inside cam abuts second terminal end of second brake base tab 80. Upper inside cam abuts outer surface of second brake base tab 80. Upper inside cam maintains second pin arm 240 in the radially extended position so that second pickup pin 252 extends through second pickup pin orifice 154 of circumferential wall portion 150 of spinnerhead assembly 130 for engaging fishing line for wrapping line around hub 386 of spool 380.

Second surface 210 of first cam member 200 and second surface of second cam member 270 are spaced a distance above first end 312 of body spool boss 310 and above cam engaging protrusions 322 for facilitating friction free rotation of first cam member 200 and second cam member 270 with respect to body spool boss 310.

Figure 2:
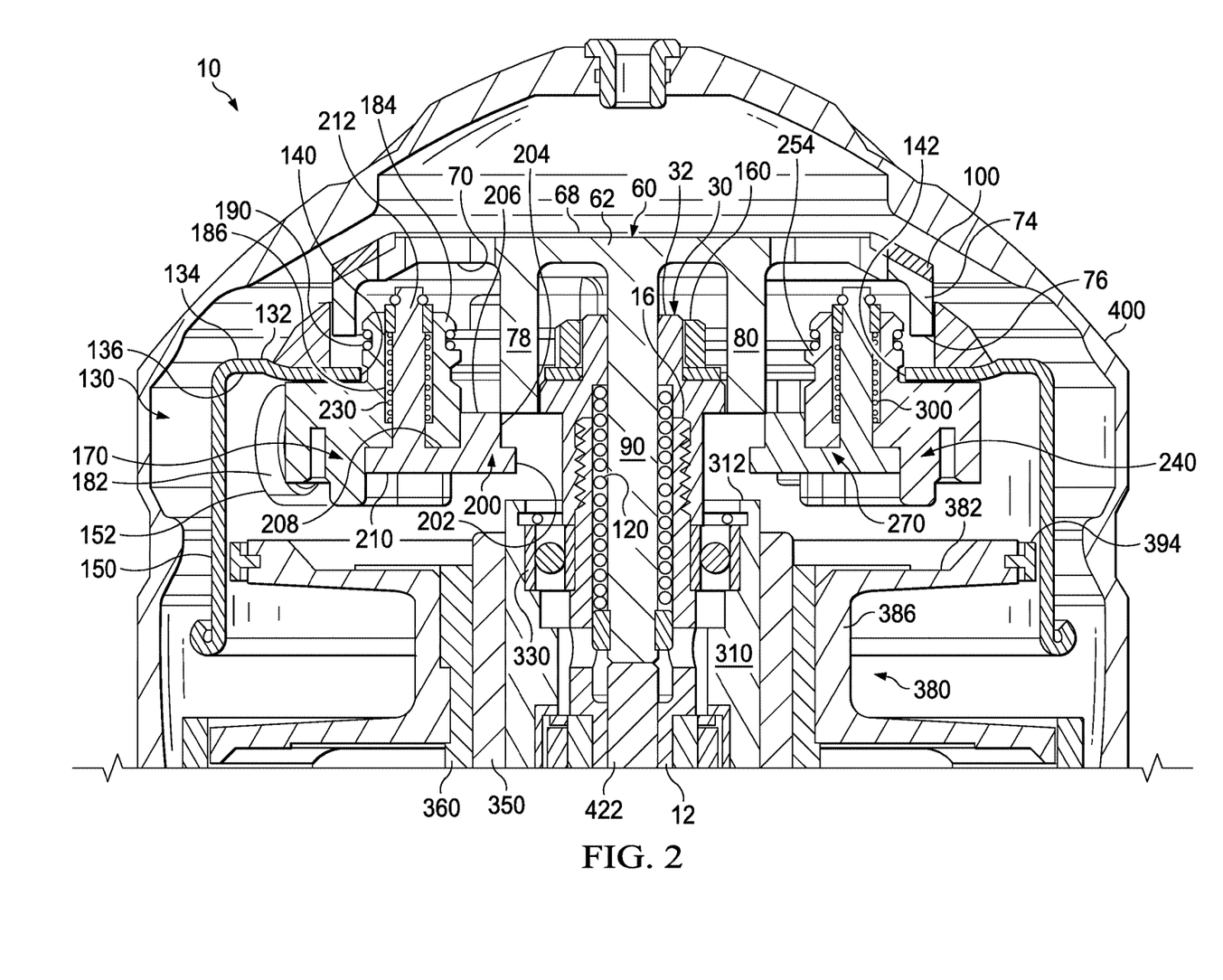
FIG. 2 is a cross-sectional view of a spincast reel of FIG. 1 shown in a line pre-release position.

Referring now to FIG. 2, shown is reel 10 in line prerelease position. When the thumb button or lever is depressed, actuator stem 422 is axially moved in a first direction. Actuator stem 422 contacts terminal end of brake base stem 90 thereby axially displacing brake base 60 away from spinnerhead assembly 130 towards cover 400.

Upper surface 206 of upper inside cam 204 of first cam member 200 slides towards terminal end of first brake base tab 78.

Upper surface 206 of upper inside cam 204 of second cam member 270 slides towards terminal end of second brake base tab 80.

First pin arm 170 is retained in the radially extended position by upper inside cam 204 acting against outside surface of first brake base tab 78.

Second pin arm 240 is retained in the radially extended position by upper inside cam acting against outer surface of second brake base tab 80.

First cam member 200 is retained in axially retracted position by first cam spring 230. Second surface 210 of first cam member 200 is separated from first end 312 of body spool boss 310.

Figure 3:
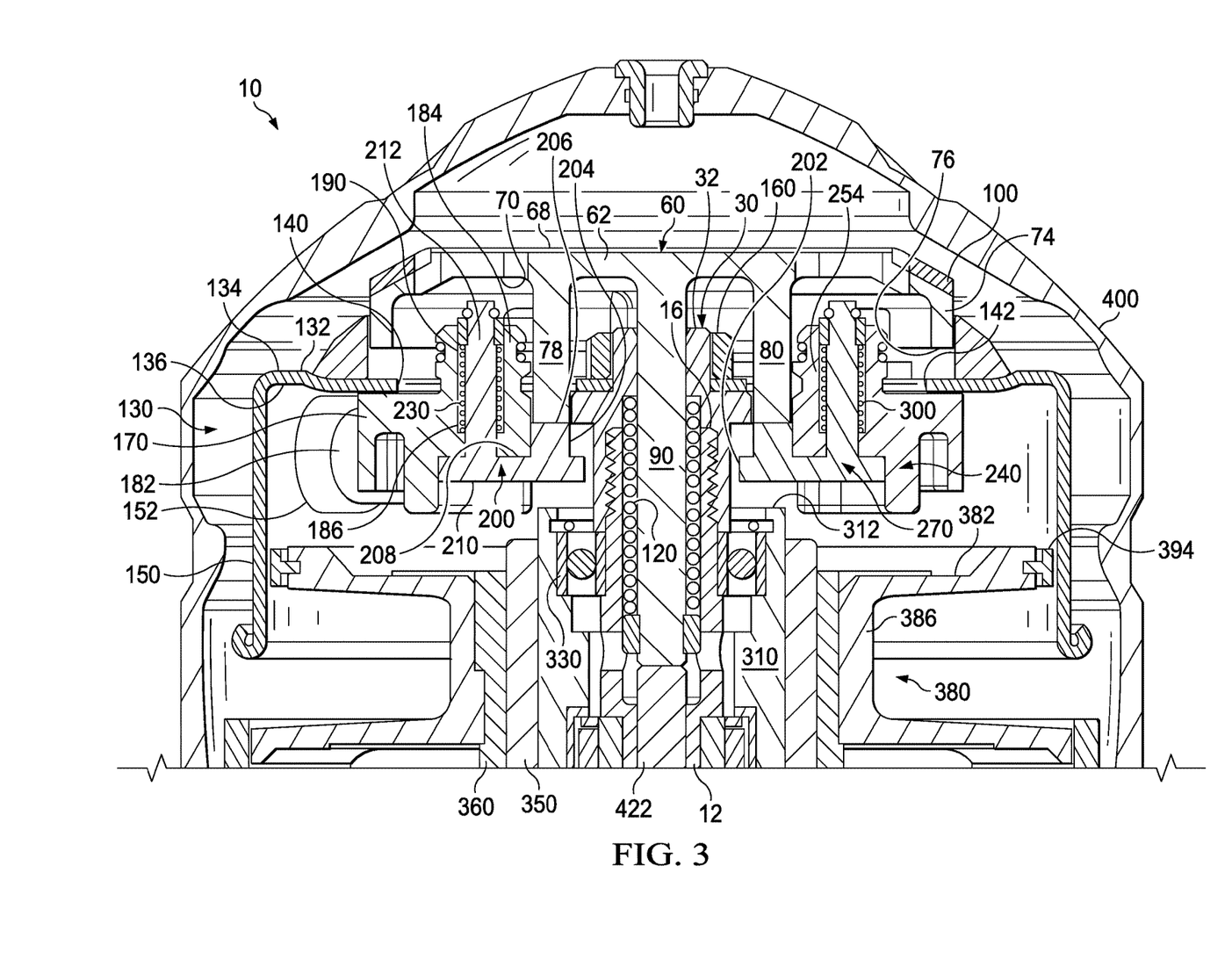
FIG. 3 is a cross-sectional view of a spincast reel of FIG. 1 shown in a line release position.

Referring now to FIG. 3, fishing reel 10 is shown in the line release position. The thumb button or lever is further depressed, thereby further axially displacing actuator stem 422 that contacts terminal end of brake base stem 90. The further axial displacement further axially displaces brake base 60 further away from spinnerhead assembly 130 towards cover 400.

Upper inside cam 204 of first cam member 200 slides off of terminal end of first brake base tab 78.

First pin arm spring 190 retracts first pin arm 170 and second pin arm 240 radially inwardly to the radially retracted position, thereby retracting first pickup pin 182 and second pickup pin 252 to a location within circumferential wall portion 150 of spinnerhead assembly 130 for releasing fishing line.

Upper surface 206 of upper inside cam 204 of first cam member 200 is positioned adjacent terminal end of first brake base tab 78.

Similarly, upper surface of upper inside of second cam member 270 is positioned adjacent terminal end of second brake base tab 80.

First cam member 200 is retained in the axially retracted position by first cam spring 230. Second surface 210 of first cam member 200 is spaced a distance from first end 312 of body spool boss 310.

Second cam member 270 is retained in the axially retracted position by second cam spring 300. Second surface of second cam member 270 is spaced a distance from first end 312 of body spool boss 310.

Figure 4:
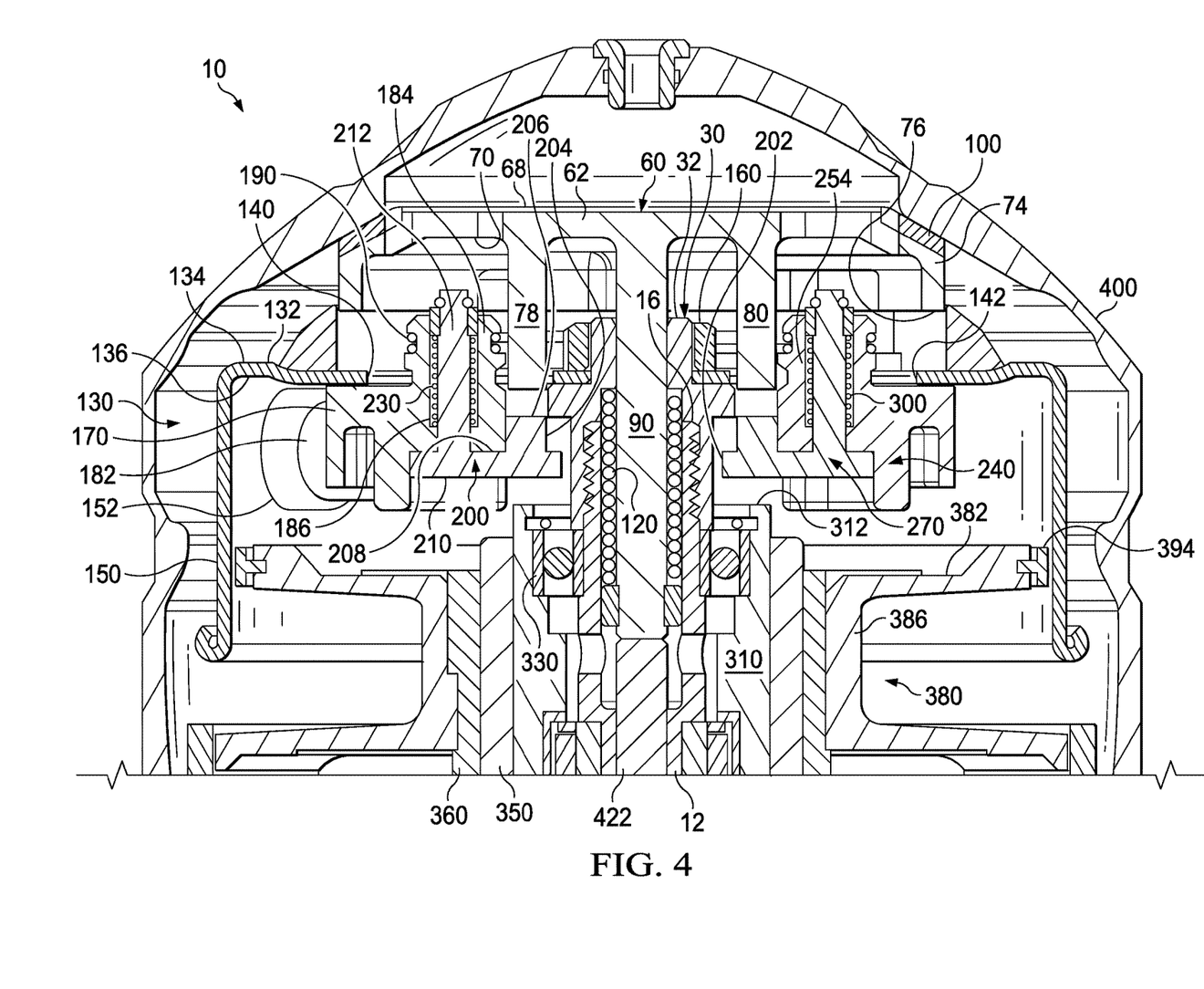
FIG. 4 is a cross-sectional view of a spincast reel of FIG. 1 shown in a line hold position.

Referring now to FIG. 4, reel 10 is shown in a line hold position. The thumb button or lever is fully depressed, thereby fully axially displacing actuator stem 422 that is in contact with terminal end of brake base stem 90. Brake base 60 is therefore further axially displaced away from spinnerhead assembly 130 into contact with inside surface of cover 400 for clamping fishing line between brake pad 100 on brake base 60 and inside surface of cover 400.

First brake base tab 78 is separated from upper surface 206 of upper inside cam 204 of first cam member 200.

Similarly, second brake base tab 80 is separated from upper surface of upper inside cam of second cam member 270.

First pin arm 170 is retained in the radially retracted position by pin arm spring 190. First cam member 200 is retained in the axially retracted position by first cam spring 230. Second surface 210 of first cam member 200 is spaced a distance from first end 312 of body spool boss 310.

Second pin arm 240 is retained in the radially retracted position by pin arm spring 190.

Second cam member 270 is retained in the axially retracted position by second cam spring 300. Second surface of second cam member 270 is spaced a distance from first end 312 of body spool boss 310.

Referring now to FIG. 5, reel 10 is shown in a casting/line free position. In the casting/line free position, the thumb button or lever is released. Brake base spring 120 returns brake base 60 to the axially retracted position out of contact with inside surface of cover 400.

First brake base tab 78 contacts upper surface 206 of upper inside cam 204 of first cam member 200.

Second brake base tab 80 contacts upper surface of upper inside cam of second cam member 270.

First pin arm 170 is retained in the radially retracted position by pin arm spring 190.

First cam member 200 is moved to the axially extended position by first brake base tab 78, thereby compressing first cam spring 230. Second surface 210 of first cam member 200 makes contact with or is located proximate to first end 312 of body spool boss 310 (see also, e.g., FIG. 8).

Second pin arm 240 is retained in the radially retracted position by pin arm spring 190.

Second cam member 270 is moved to the axially extended position by second brake base tab 80, thereby compressing second cam spring 300. Second surface of second cam member makes contact with or is located proximate to first end 312 of body spool boss 310, similarly to the position of first cam member 200 in FIG. 8.

Referring now to FIG. 6, fishing reel 10 is shown in the re-engage line retrieve position. In the re-engage line retrieve position, the crank is turned for retrieving fishing line. Brake base 60 and spinnerhead assembly 130 rotate with respect to body spool boss 310.

Cam engaging protrusions 322 on first end 312 of body spool boss 310 contact lower inside cam 202 of first cam member 200 for manipulating first pin arm 170 into the radially extended position.

Cam engaging protrusions 322 on first end 312 of body spool boss 310 contact lower inside cam of second cam member 270 for manipulating second pin arm 240 into the radially extended position.

When first pin arm 170 is moved into the radially extended position, the upper surface 206 of the upper inside cam 204 of first cam member 200 slides off of terminal end of first brake base tab 78 for facilitating axial retraction of first cam member 200 into the axially retracted position, i.e., into the line retrieve position of FIG. 1 discussed above.

When second pin arm 240 is moved into the radially extended position, the upper surface of upper inside cam of second cam member 270 slides off of terminal end of second brake base tab 80 for facilitating axial retraction of second cam member 270 into the axially retracted position, i.e., into the line retrieve position discussed above.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

Thus, it is apparent that there is been provided, in accordance with the invention, a reel that fully satisfies the objects, aims and advantages set forth above. While the invention has been described in conjunction with specific embodiments thereof, including the interchangeability of components of those embodiments, it is evident that many alternatives, modifications and variations will be apparent to those skilled in the art and in light of the foregoing description. Accordingly, it is intended to embrace all such alternatives, modifications and variations as fall within the spirit of the appended claims.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A fishing reel comprising:
   a body spool boss having first end, said first end defining cam engaging structure;
   a spool having a hub defining a hub passageway therethrough, said spool for receiving fishing line, said hub passageway receiving said body spool boss;
   a reel cover surrounding said spool;
   a brake base positionable in a first position adjacent said reel cover and a second position spaced away from said reel cover;
   a spinner head assembly adjacent to said brake base, said spinner head assembly having a first side and a second side;
   a pin arm having a first side and a second side, said pin arm pivotally affixed to said second side of said spinner head assembly wherein said first side of said pin arm is adjacent said second side of said spinner head assembly, said pin arm positionable in a radially extended position and a radially retracted position;
a cam member attached to said pin arm for radial pivoting with said pin arm, said cam member positionable in a retracted position and an extended position, wherein said cam member comprises a second surface and a contacting surface;
wherein when said cam member is in said retracted position, said contacting surface is spaced a distance away from said first end of said body spool boss for facilitating friction free relative rotation of said cam member with respect to said body spool boss.

2. The fishing reel according to claim 1 wherein said body spool boss and said spool are rotatably fixed with respect to one another.

3. The fishing reel according to claim 1 wherein said cam engaging structure comprises cam engaging protrusions.

4. The fishing reel according to claim 1 wherein said cam member is biased in said retracted position.

5. The fishing reel according to claim 1 wherein said cam member is positionable in said retracted position and said extended position via axial movement.

6. The fishing reel according to claim 1 wherein:
said cam member comprises a lower inside cam; and
said lower inside cam defines said contacting surface.

7. The fishing reel according to claim 1 wherein:
when said cam member is in said extended position, said second surface of said cam member is adjacent to said first end of said of said body spool boss wherein said cam engaging structure of said body spool boss engages said contacting surface of said cam member when said cam member and said body spool boss are rotated relative to one another.

8. A method of retrieving fishing line after a cast comprising the steps of:
rotating a spinner head assembly with respect to a spool and with respect to a body spool boss having first end, said first end defining cam engaging structure;
positioning a brake base in a second position spaced away from a reel cover;
contacting a contacting surface of a cam member with said cam engaging structure on said first end of said body spool boss for moving a pin arm from a radially retracted position to a radially extended position;
retracting said cam member to a retracted position wherein said contacting surface is spaced a distance away from said first end of said body spool boss for facilitating friction free relative rotation of said cam member with respect to said body spool boss.

9. The method according to claim 8 wherein said body spool boss and said spool are rotatably fixed with respect to one another.

10. The method according to claim 8 wherein said cam engaging structure comprises cam engaging protrusions.

11. The method according to claim 8 wherein said cam member is biased in said retracted position.

12. The method according to claim 8 wherein said cam member is positionable in said retracted position and an extended position via axial movement.

13. The method according to claim 8 wherein:
said cam member comprises a lower inside cam; and
said lower inside cam defines said contacting surface.

14. A fishing reel comprising:
a spinner head assembly having a second side;
a pin arm pivotally mounted to said second side of said spinner assembly, said pin arm movable from a radially extended position and a radially retracted position, said pin arm defining a first pin arm passageway;
a cam member having a first surface and a second surface, said cam member having a cam member shaft extending from said second surface, said cam member shaft received in said first pin arm passageway, said cam member movable to a retracted position and an extended position;
a body spool boss having a first end;
a cam engaging structure extending from said first end of said body spool boss for selectively engaging said cam member for extending said pin arm to said radially extended position;
wherein when said cam member is in said retracted position, said cam member is spaced away from said cam engaging structure of said body spool boss for facilitating frictionless relative rotation between said cam member and said body spool boss during line retrieval.

15. The fishing reel according to claim 14 further comprising a spool;
wherein said body spool boss and said spool are rotationally fixed with regard to one another.

16. The fishing reel according to claim 14 wherein said cam engaging structure comprises cam engaging protrusions.

17. The fishing reel according to claim 14 wherein said cam member is biased in said retracted position.

18. The fishing reel according to claim 14 wherein said cam member is positionable in said retracted position and said extended position via axial movement.

19. The fishing reel according to claim 14 wherein:
said cam member comprises a lower inside cam; and
said lower inside cam defines said contacting surface.

20. The fishing reel according to claim 14 wherein:
when said cam member is in said extended position, said second surface of said cam member is adjacent to said first end of said of said body spool boss wherein said cam engaging structure of said body spool boss engages said contacting structure of said cam member when said cam member and said body spool boss are rotated relative to one another.

21. A method of retrieving fishing line comprising the steps of:
locating a cam member proximate a body spool boss during a casting state for positioning said cam member to be acted on by cam engaging structure of said body spool boss;
rotating said cam member relative to said body spool boss;
moving said cam member and a pickup pin radially outwardly with said cam engaging structure;
axially moving said cam member away from said body spool boss;
rotating said cam member and said body spool boss relative to one another during line retrieve state;
wherein said cam member and said body spool boss are spaced apart from one another for facilitating frictionless relative rotation.

22. A fishing reel comprising:
a body spool boss having a first end defining cam engaging structure;
a cam member in communication with a pin arm;
wherein said cam member is axially moveable and is radially moveable with regard to said body spool boss for selectively facilitating contact between said cam member and said cam engaging structure and selectively facilitating frictionless relative rotation of said cam member and said cam engaging structure.

23. The fishing reel of claim 22 wherein:

said cam member is attached to a pin arm; and wherein radial movement of said cam member results in radial movement of said pin arm.

\* \* \* \* \*